3,360,418
BEAD-RING BUILDING-IN MECHANISM FOR A PNEUMATIC TYPE BUILDING MACHINE

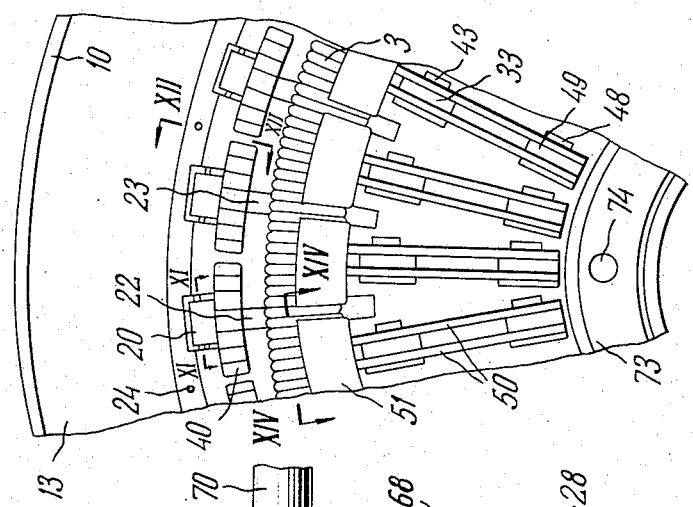
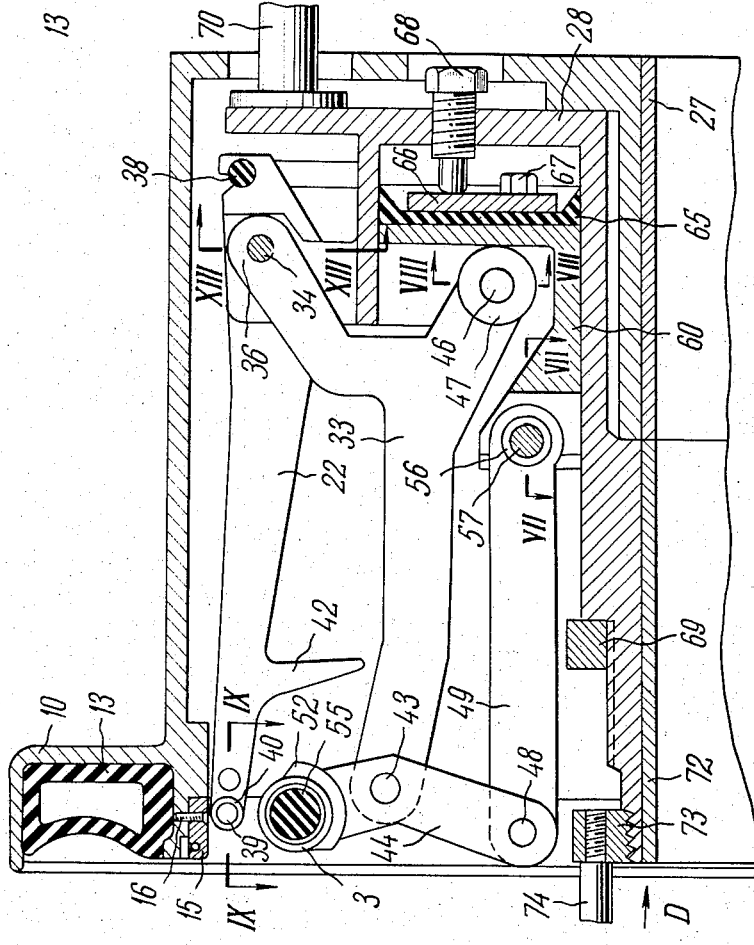
FIG. 6
FIG. 5

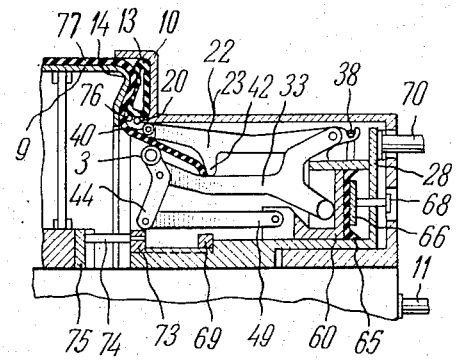
FIG. 18
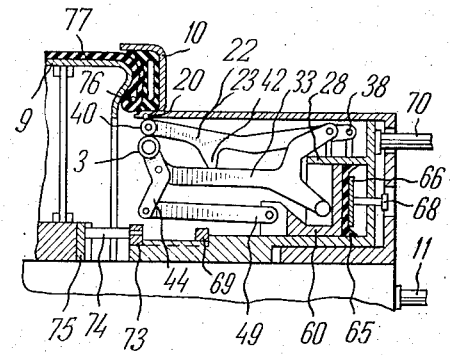
FIG. 20
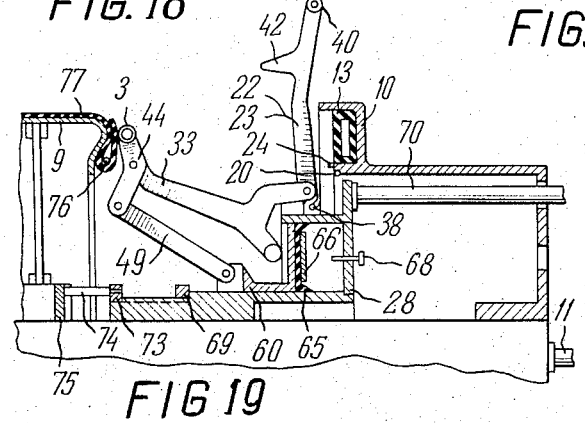
FIG. 19
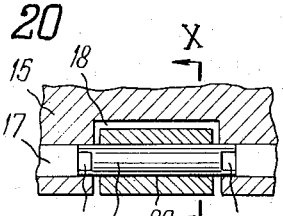
FIG. 11
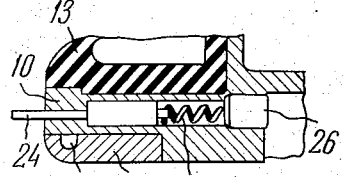
FIG. 12
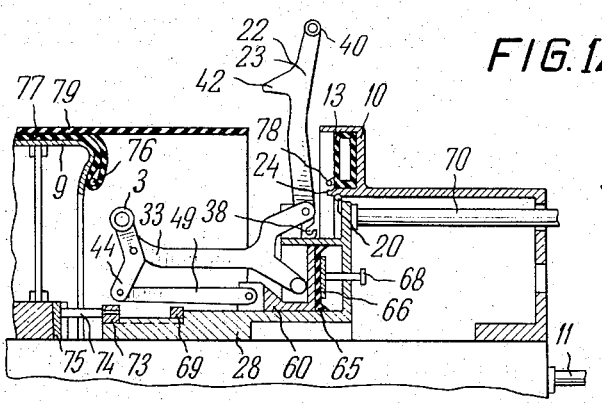
FIG. 21
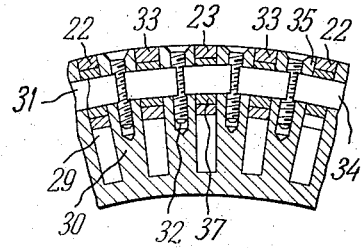
FIG. 13
FIG. 14

Grigory Vasiljevich Novikov, Alexandr Fedorovich Tikhomirov, Konstantin Nickolaevich Baranov, and Leonid Stepanovich Sataev, Jaroslavl, U.S.S.R., assignors to Jaroslavsky Gosudarstvenny Shynny, Zavod, Jaroslavl, Polushkina Roshcha
Filed Oct. 31, 1963, Ser. No. 320,321
20 Claims. (Cl. 156—400)

The present invention relates to mechanisms for building in bead rings of pneumatic tires assembled on shoulder drums of tire-building machines operating by either the band or layer assembly methods.

Mechanisms are known for building in bead rings which comprise right-and left-hand units, substantially identical in design, and each of which consists of a tire-building drum mounted on the shaft of the machine, a bead former with an inflatable annular pneumatic bag or tube and the actuating drive of a helical garter spring with expanding turndown levers and guide disks and bushings.

In known mechanisms for building in bead rings, where the tires are assembled on shoulder drums, the actuating drive of the helical garter spring is designed as an annular inflatable pneumatic tube with expanding turndown levers which advance sectors, carrying the helical garter spring, in the disk guides.

A disadvantage of the known mechanisms for building in bead rings of tires is the limited travel of the helical garter spring which does not allow these mechanisms to be employed for building in the bead rings of tires, sizes 11.00–20, 12.00–20, as well as other sizes accommodated by shoulder drums with a shoulder height in excess of 75 mm. Moreover, the annular pneumatic tube is subject to rapid wear. The replacement of worn tubes leads to prolonged shutdowns of the tire-building machine.

An object of the present invention is to provide a simple mechanism, reliable in operation, which is capable of building in bead rings of pneumatic tires assembled on shoulder drums with either low, medium or high shoulder heights.

A further object of the present invention is to prevent the formation of folds or wrinkles between the rollers of adjacent turndown levers of the turndown mechanism and stretching of the edges of the cord band on the drum shoulders.

A still further object of the present invention is to provide means in the bead formers of a mechanism which will enable the wear of the surfaces of the turndown levers and said bead formers to be reduced at the points of contact in their motion.

Another object of the present invention is to provide for adjustment of the clearance between the helical garter spring and the rollers of the turndown levers depending upon the thickness of the cord bands employed to build the tire.

These objects are accomplished by the use of an actuating drive for the helical garter spring which is designed as an annular pneumatic cylinder with a system of levers, hinge-jointed together as well as to the said pneumatic cylinder and its piston.

One of the means for achieving the aforesaid objects is the use of an adjustable stop mounted on the bushing of the annular pneumatic cylinder and designed to limit the travel of the piston in the annular pneumatic cylinder in the direction of the tire-building drum when the band method of tire assembly is being applied.

Another means of achieving the aforesaid objects is the use of guide bushings fitted on the rods of the pneumatic cylinders and flat stops, mounted on a flange of the machine housing, designed to limit the travel of the actuating drive of the helical garter spring in the direction of the tire-building drum when the layer method of tire assembly with a feeding drum is being applied.

Still another means of achieving the aforesaid objects is the use of a cylinder mounted on rollers on the outside surface of the bead former body, the edges of the said cylinder being held by springs against the tire-building drum and the cylinder being capable of rotating together with the drum.

The above-mentioned objects are accomplished by the provision of adjustable stops in the end of the annular pneumatic cylinder which limit travel of the annular pneumatic cylinder piston in the direction away from the tire-building drum, and also by the provision of rollers in the bead former of the mechanism. These rollers are mounted at the points of contact between the said bead former and the turndown levers, at one end of which fingers are rigidly secured, the said fingers being located parallel to the axes of the turndown lever rollers.

The present invention may be applied in the design of mechanisms for building in bead rings of automobile, tractor and aircraft tires of various sizes, assembled on semi-flat or shoulder drums with low or high shoulder heights and using one, two or thee bead rings in the tire bead.

The present invention may be used in mechanisms for building in bead rings that are component parts of tire-building machines and automatic transfer machines producing tires on a flow-line production basis.

Tires may be assembled by means of the above-mentioned mechanisms using either the band method or the layer method with a feeding drum.

In tire assembly by the band method, the afore-mentioned mechanism for building in the bead rings enables bands consisting of two, three, four, five and six layers of cord to be used.

In accordance with the aforesaid and other objects, the present invention is described in the form of a new arrangement and combination of components and parts as follows.

Other objects, uses and advantages of the present invention will become apparent to those skilled in the art from the following description and the accompanying drawings in which:

FIGURE 5 is a longitudinal sectional view taken along the line 5—5 in FIG. 3 the actuating drive of the helical garter spring in the contracted state;

FIGURE 6 is a fragmentary end view as viewed in the direction of arrow D in FIG. 5 of the right-hand unit of the mechanism for building in the bead rings of pneumatic tires;

FIGURE 11 is a fragmentary sectional view taken along the line 11—11 in FIG. 6 and shows the fastening of the roller pins in the ring of the bead former;

FIGURE 12 is a fragmentary sectional view taken along the line 12—12 in FIG. 6 and shows the fastening of the pins in the bead former body;

FIGURE 13 is a fragmentary sectional view taken along the line 13—13 in FIGS. 5 and shows the arrangement of the turndown and expanding levers and their fastening in the annular pneumatic cylinder;

FIGURE 14 is a fragmentary sectional view taken along the line 14—14 in FIG. 6 and shows the joint connecting the ends of the helical garter spring;

FIGURE 18 shows the position of the cord band, bead ring and components of the mechanism in reference to the drum when positioning the bead ring;

FIGURE 19 shows the position of the cord band, bead ring and components of the mechanism in reference to the drum after turning the end portion of the cord band over the bead ring;

FIGURE 20 shows the position of the cord band, bead ring and components of the mechanism in reference to the drum in lapping the tire bead with the annular pneumatic tube;

FIGURE 21 shows the position of the second cord band, second bead ring and components of the mechanism in reference to the drum before building in the second bead ring;

Figure 1:
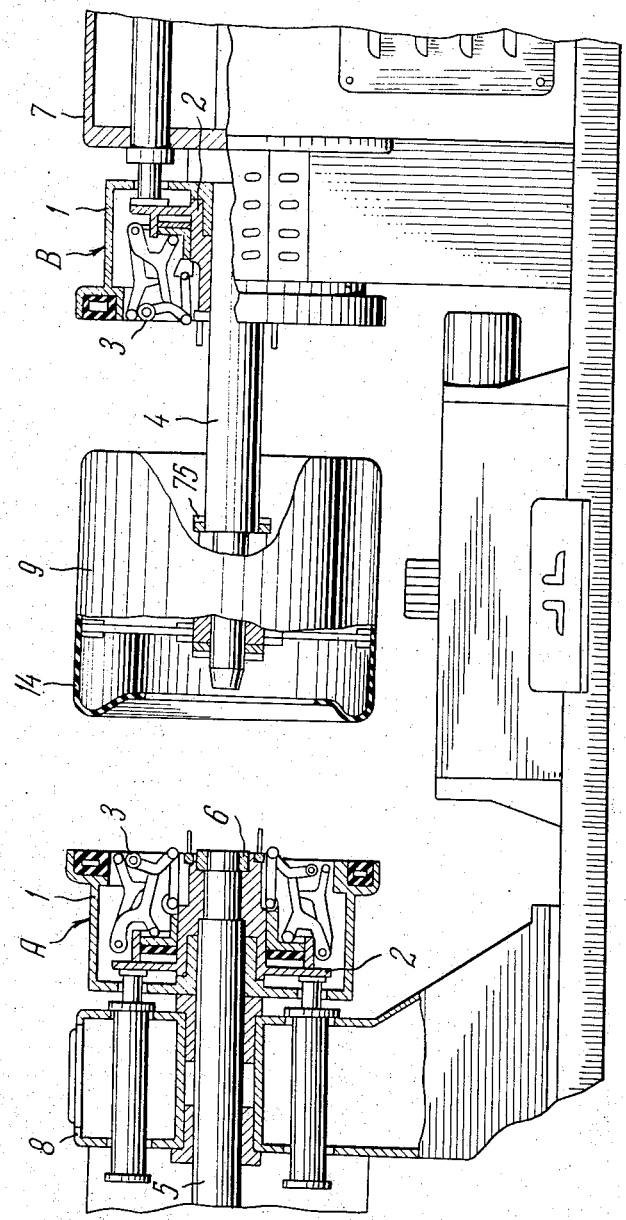
FIGURE 1 is a front elevational view of the mechanism for building in the bead rings of pneumatic tires as installed on the tire-building machine.

The mechanism for building in the bead rings of pneumatic tires, designed for tire assembly, consists of two substantially identical units A and B (FIG. 1).

Each unit includes bead former 1 and actuating drive 2 of helical garter spring 3.

Bead formers 1 are substantially identical in design and simultaneously perform identical operations. Actuating drive 2 of helical garter spring 3 in unit A differs from actuating drive 2 of helical garter spring 3 in unit B only in the manner by which they are mounted on shafts 5 and 4, respectively. Actuating drive 2 of helical garter spring 3 in unit A is clamped rigidly on shaft 5 by means of nut 6. Actuating drive 2 of helical garter spring 3 in unit B can slide along shaft 4 of housing 7. Actuating drives 2 of helical garter springs 3 in units A and B simultaneously perform identical operations. Unit A is mounted on movable housing 8 which can travel in a direction perpendicular to the axis of shaft 4. When building in bead rings of a tire the axis of shaft 5 coincides with that of shaft 4. Before removing the assembled tire from drum 9, housing 8 together with unit A is shifted away from the axis of drum 9. Unit B is mounted on stationary housing 7.

Since both of the two units, A and B, for building in the bead rings of tires, as well as the operations they perform, are identical, only the components and parts of unit B are shown in detail in the drawings and will be referred to in the following description.

Figure 4:
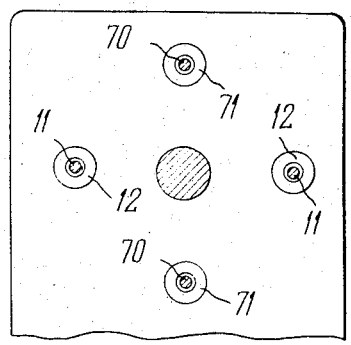
FIGURE 4 is a cross sectional view taken along the line 4—4 in FIG. 2.
Figure 22:
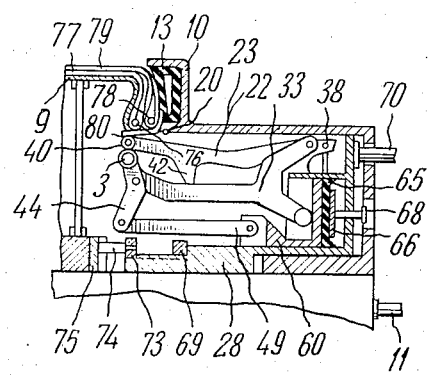
FIGURE 22 shows the position of the first and second cord bands, the first and second bead rings, the flipper and components of the mechanism in reference to the drum after turning the flipper under the bead.

Bead former 1 (FIGS. 1, 2 and 4) consists of housing 10 rigidly secured to rods 11 of two pneumatic cylinders 12, cantilever-mounted and diametrically opposed in the end face of housing 7. By the action of rods 11 housing 10 is traversed along shaft 4 toward drum 9 until annular pneumatic tube 13 contacts shoulder 14 of drum 9. Ring 15, inserted into the end face of housing 10, is fastened to the housing by screws 16 (FIG. 5). Ring 15 has an annular groove 17 (FIGS. 11 and 12) in its outside surface and equally spaced slots 18 in its end face. Pins 19 with rollers 20 are arranged in groove 17 and slots 18 of ring 15. Pins 19 do not rotate nor shift axially since flats 21 are provided at their ends. Rollers 20 rotate freely on pins 19 preventing premature wear of turndown levers 22 and 23 with which they contact during lever motion (FIG. 6). Pins 24 are secured in housing 10 by set screws 26 (FIGS. 6 and 12) under the action of springs 25 and are inserted between annular pneumatic tube 13 and ring 15 equally spaced around a circle.

Figure 2:
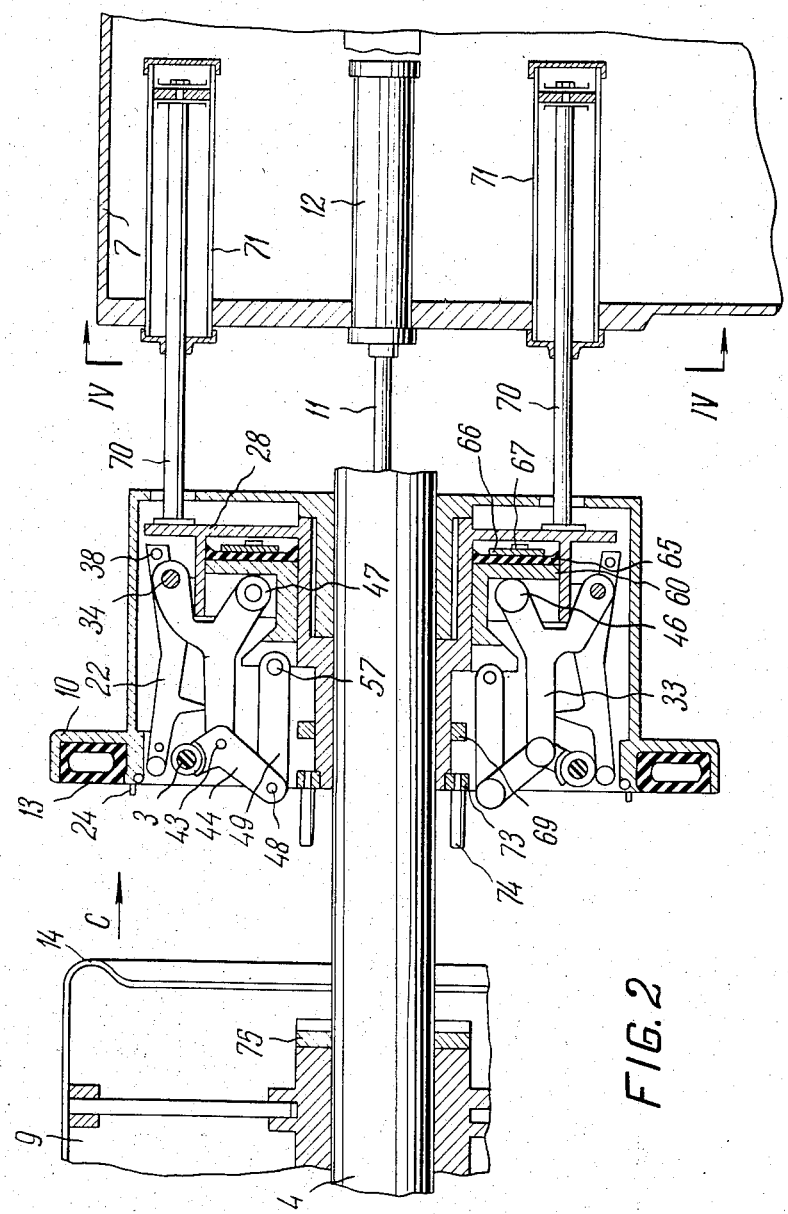
FIGURE 2 is a longitudinal vertical sectional view on enlarged scale of the righthand unit of the mechanism as shown in FIG. 1 for building in the bead rings of pneumatic tires.

Bushing 27 (FIG. 5) is press-fitted into the bore of housing 10 (FIG. 5), and is constituted of an antifriction material. Actuating drive 2 (FIG. 1) of helical garter spring 3 includes annular pneumatic cylinder 28 (FIGS. 2 and 5). Identical slots 29 (FIG. 13) and identical projections 30 are provided on the external surface of the wall of cylinder 28. An annular groove 31 and threaded holes 32 are provided in the projections 30.

Expanding levers 33 and turndown levers 22 and 23 are fitted into slots 29. All levers are pivoted on pins 34 which are secured by means of washers 35 and screws 36. Bushings 37, made of an antifriction material, are press-fitted into the bores of levers 22, 23 and 33. The arrangement and order of turndown levers 22, expanding levers 33 and turndown levers 23 are illustrated in FIG. 13.

Figure 15:
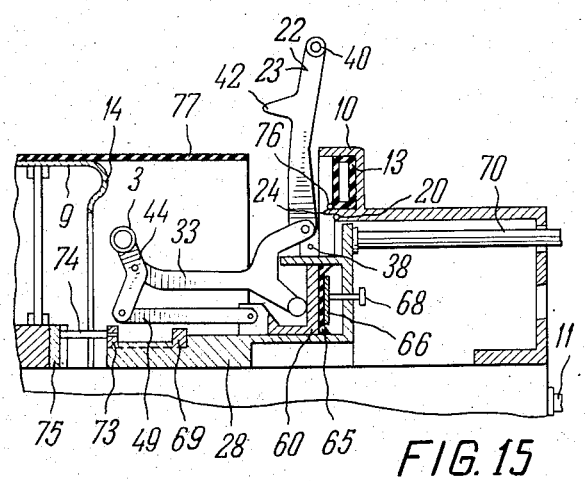
FIGURE 15 shows the position of the cord band, bead ring and components of the mechanism in reference to the drum before building in the first bead ring.
Figure 9:
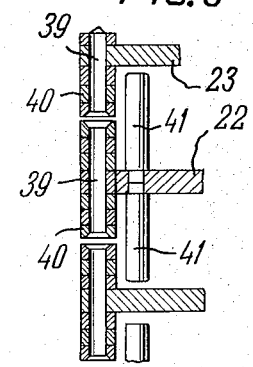
FIGURE 9 is a fragmentary sectional view taken along the line 9—9 in FIG. 5 and shows the fastening of the rollers and fingers on the turndown levers.
Figure 17:
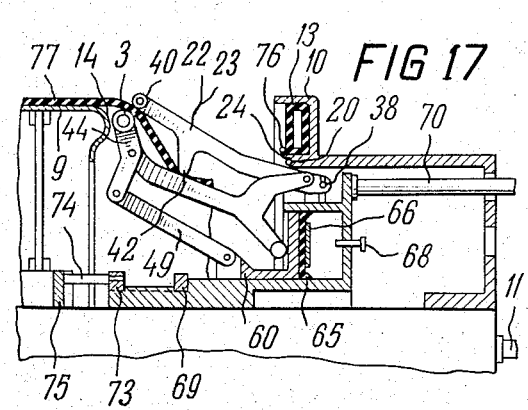
FIGURE 17 shows the position of the cord band, bead ring and components of the mechanism in reference to the drum when the end portion of the cord band is clasped.
Figure 10:
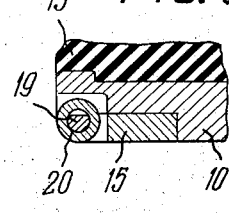
FIGURE 10 is a fragmentary sectional view taken along the line 10—10 in FIG. 11 and shows the position of the rollers in the ring of the bead former.

On one end of turndown levers 22 (FIG. 5) and turndown levers 23, there is fitted a resilient contracting ring 38, which may for example be constituted of rubber. The ring 38 tends to turn levers 22 and 23 on their pivot pins 34 to the raised position shown in FIG. 15. On the other end of turndown levers 23 (FIG. 9) rollers 40 are freely mounted on pins 39; turndown levers 22 also carry freely-mounted rollers 40 on pins 39 at their other end, as well as rigidly-fitted fingers 41. To hold rollers 40 on pins 39 the edges on the end face of pins 39 are flanged over. In the position of the turndown levers 22 and 23 that is shown in FIGS. 6 and 9, rollers 40 and fingers 41 form a closed ring. All turndown levers 22 and 23 are provided with lugs 42 (FIG. 5).

Figure 8:
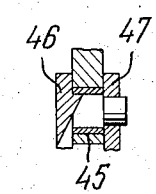
FIGURE 8 is a fragmentary sectional view taken along the line 8—8 in FIG. 5 and shows the joint securing the expanding lever and the roller and pin.

One end of each of the expanding levers 33 (FIG. 5) is pivoted to annular pneumatic cylinder 28, the other end being hingeably connected by means of pins 43 with carrying levers 44. Pins 46 with rollers 47 rotate in bushings 45 (FIGS. 5 and 8) which are press-fitted in a third end of levers 33. Rollers 47 are rigidly mounted on pins 46.

Carrying levers 44 (FIG. 5) are hingeably connected by means of pins 48 with orienting levers 49. Each carrying lever 44 (FIG. 6) consists of two cheeks 50 and sector 51 having a groove 52 (FIG. 5).

The form of this groove corresponds to the diameter of the turns of the helical garter spring 3. Cheeks 50 are rigidly secured to sector 51. Helical garter spring 3 is fitted over sectors 51. In the position shown in FIG. 6 the turns of helical garter spring 3 are at the minimum distance from each other, i.e., the spring is contracted. The two ends of helical garter spring 3 are joined together on a sleeve 53 (FIG. 14). Helical groove 54 is provided in sleeve 53 to accommodate the turns of helical garter spring 3. A resilient contracting ring 55, constituted for example of rubber, is inserted into helical garter spring 3 and sleeve 53. The ring 55 is in the form of a rope, which is threaded through spring 3 and the ends are glued together to form the ring. Resilient ring 55 tends to compress the turns of helical garter spring 3 to their minimum pitch.

Figure 7:
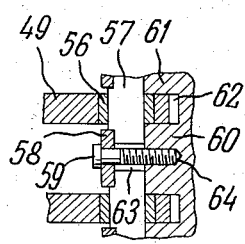
FIGURE 7 is a fragmentary sectional view taken along the line 7—7 in FIG. 5 and shows the pivot linking the orienting levers to the piston of the actuating drive of the helical garter spring.

Orienting levers 49 (FIGS. 5 and 7), having press-fitted bushings 56, are hingeably connected to piston 60 by means of pins 57 which are secured by washers 58 and screws 59. Piston 60 is substantially a bushing integral with a flange. The end face of the bushing of piston 60 carries the lugs 61 (FIG. 7) between which are slots 62. Annular groove 63, provided in the lugs 61, is concentric with the bushing axis. Threaded holes 64 are provided in the groove in lugs 61 for securing pins 57 in groove 63 by means of washers 58 and screws 59. Cup 65 is secured to the flange of piston 60 (FIG. 5) by means of ring 66 and screws 67. This cup seals the clearance between piston 60 and annular pneumatic cylinder 28. Piston 60, is slidable along the bushing of annular pneumatic cylinder 28, under the action of compressed air. The piston is movable from a position in abutment with screws 68 (FIG. 5) to a position in abutment with nut 69. The piston 60 is returned to the position in abutment with screws 68 under the action of helical garter spring 3 and resilient ring 55 inside the spring when compressed air is released from the cylinder 28. Spring 3 and ring 55 act through carrying levers 44, expanding levers 33 and orienting levers 49 to act on the piston 60. The stroke of piston 60 may be altered by the adjustment of nut 69 and screws 68. This change in the stroke of piston 60 alters the distance travelled by helical garter spring 3 in a radial direction during expansion and contraction.

Moreover, the adjustment of screws 68 changes the magnitude of the gap between helical garter spring 3 and rollers 40 of turndown levers 22 and 23. Carrying lever 44, hingeably connected to expanding lever 33 and orienting lever 49, comprises a lever unit. The number of such lever units linked to annular pneumatic cylinder 28 and piston 60 may vary depending upon the diameter of the tire size for which the mechanism for building in the bead rings is intended. All lever units perform identical actions. FIGS. 15 to 22, inclusive, show the various lever positions of one unit to demonstrate the operation of the levers and helical garter spring 3.

In all positions of helical garter spring 3 (FIG. 5) the projection of its axis on the machine shaft axis is farther from piston 60 than the projection of pin 43 on the machine shaft axis.

Annular pneumatic cylinder 28 is rigidly secured to rods 70 (FIGS. 2 and 4), passing through holes in the end face of housing 10, of two pneumatic cylinders 71 mounted on the end face of housing 7 in cantilever fashion and diametrilly opposed to each other. By the action of rods 70 of pneumatic cylinders 71, annular pneumatic cylinder 28 slides with its bushing 72 (FIG. 5) along shaft 4 of the machine (FIG. 2), independent of housing 10 of the bead former. On the bushing of annular pneumatic cylinder 28, ring 73 is fitted (FIGS. 2 and 5) into which two diametrally opposed fingers 74, of equal length, are secured. Ring 73 is fitted rigidly on the bushing of annular pneumatic cylinder 28. A stationary thrust ring 75 (FIG. 2) is rigidly fitted on shaft 4 of the machine adjacent to the face of the hub of drum 9. Thrust ring 75 has a rectangular cross section. One face of the ring has several pairs of projections of different height.

Each two projections of the same height, are arranged diametrally opposite to each other, and serve as a stop for fingers 74 thereby limiting the travel of annular pneumatic cylinder 28

The number of pairs of projections corresponds to the number of cord bands of the tire being assembled. The height of the projections is related to the height of fingers 74 and to the required distance from shoulder 14 to helical garter spring 3 in the position shown in FIG. 16. The distance from shoulder 14 to helical garter spring 3 is determined on the basis of the thickness of the cord bands being used. Thrust ring 75 (FIG. 15) is set to the required position with respect to fingers 74 of ring 73 by turning the shaft of the machine so that the desired projections of thrust ring 75 are opposite fingers 74 of ring 73.

The mechanism for building in bead rings in a tire assembly by the band method operates in the following manner.

Since left-hand unit A and right-hand unit B of the mechanism for building in the bead rings of tires perform the identical operations simultaneously, only the operation of the mechanism in the right-hand unit B is herein described. Unit B is initially in its extreme position farthest from drum 9.

Tire-building drum 9 is placed in its idle, contracted position. The required number of bead rings 76 (FIG. 15) for the beads of one tire are passed by hand over the contracted drum 9. The first bead ring 76 is placed on the pins 24; the rest are inserted into drum 9 under shoulder 14.

Band 77, comprised of the required number of cord layers, is placed on drum 9. Drum 9 is then expanded in known manner to its working position.

Bead ring 76 is turned and set to a position where its required projections are in a plane with fingers 74. Rods 70 advance the annular pneumatic cylinder 28 out of housing 10 and into band 77 until it bears against thrust ring 75.

Figure 16:
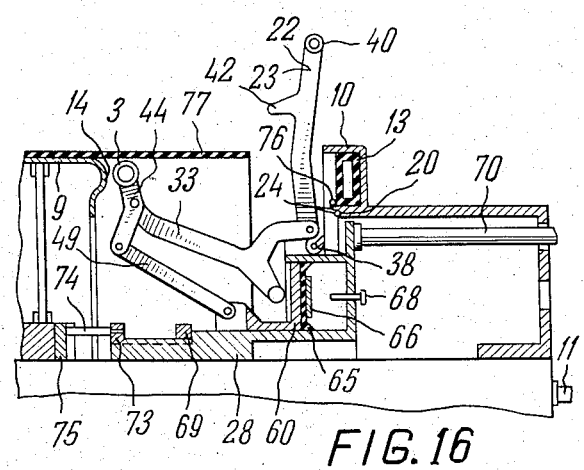
FIGURE 16 shows the position of the cord band, bead ring and components of the mechanism in reference to the drum before clasping the end portion of the cord band.

At this time, under the action of resilient ring 38, all turndown levers 22 and 23 have been raised to the vertical position. Compressed air is admitted into annular pneumatic cylinder 28 (FIG. 16).

Under the action of the compressed air, piston 60 transmits force through the levers to helical garter spring 3 which is thereby expanded to a diameter equal to the diameter of drum 9. By the action of rods 11 (FIG. 17) housing 10 is advanced toward drum 9 and rollers 20 run onto levers 22 and 23, turning them inwardly so that they are simultaneously applied to band 77 all along a circular circumferential surface and clamp the band on helical garter spring 3 by means of rollers 40. Lugs 42 of turndown levers 22 and 23 crimp the end portions of band 77, forming a goffer of equal pitch around the circumference. At the same time that housing 10 is advanced toward drum 9, all levers turn inward on their pivots toward the machine shaft and are completely enclosed by housing 10. The housing 10 forces bead ring 76 tight up against the stretched end portion of band 77. By the action of rods 11 (FIG. 19) housing 10 is withdrawn from drum 9 and compressed air is admitted at the same time into annular pneumatic cylinder 28. Piston 60 acts on the levers which expand helical garter spring 3 and the latter turns the end portion of band 77 over bead ring 76, lapping it against the tire bead.

Thereafter the compressed air is released from annular pneumatic cylinder 28 (FIG. 20). Helical garter spring 3, all levers and piston 60 return to their initial position. At the same time, by the action of rods 11, housing 10 is advanced to drum 9 and as it reaches drum 9, compressed air is admitted into annular inflatable pressing tube 13 which expands and presses the whole tire bead around the full circumference against shoulder 14 of drum 9. After pressing the bead, the compressed air is released from annular pressing tube 13.

After this, housing 10 and annular pneumatic cylinder 28 are withdrawn by rods 11 from drum 9 to the position shown in FIG. 2.

This operation concludes the building in of the bead ring for a tire with only one bead ring 76. Building in the second bead ring 78 (FIG. 21) begins with a repetition of the preceding operations; thus a second band 79 is put on drum 9, and the operation carried out as before for bead 76. Thrust ring 75 however must be turned to the position required for building in the second bead ring.

After building in the second bead ring, bead flipper 80 (FIG. 22) is applied on the bead. Thrust ring 75 is set to a position corresponding to that for turning under flipper 80. By the action of rods 11 and 70, housing 10 and annular pneumatic cylinder 28 simultaneously approach the tire bead. Housing 10 runs up against the bead and stops. Annular pneumatic cylinder 28 continues to advance. Compressed air is admitted into annular pneumatic cylinder 28. Helical garter spring 3 is expanded and bears against rollers 40 of turndown levers 22 and 23. In this movement, turndown levers 22 and 23 bear against flipper 80 and turn it under the bead.

Then the compressed air is released from annular pneumatic cylinder 28. Bead former 1 and actuating drive 2 of helical garter spring 3 are withdrawn from drum 9 and return to the position shown in FIG. 1.

The mechanism for building in the bead rings of tires assembled by the layer method differs from the mechanism for building in the bead rings of tires assembled by the band method in that cylinders 81 (FIG. 23) are fitted on bead-former housings 10 of left-hand unit A and right-hand unit B. On its inner surface cylinder 81 is provided with annular groove 82 which accommodates rollers 83, equally spaced around the circumference. At least three rollers 83 are required.

Press-fitted into rollers 83 are bearings 84 which are secured to bushings 85 by nuts 86. Bushings 85 can slide along shafts 87. One end of each of the shafts 87 is inserted into housing 10 while the other end, carrying springs 88, is inserted into brackets 89. Brackets 89 are secured rigidly to housing 10.

Figure 24:
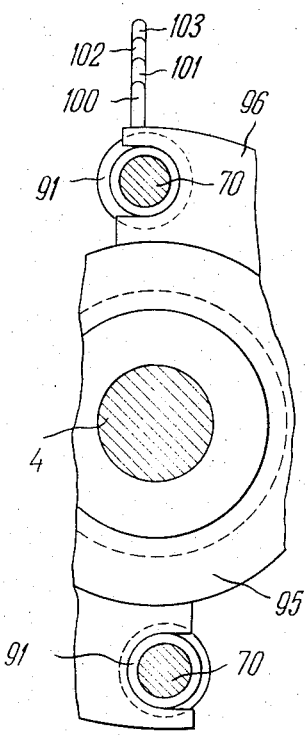
FIGURE 24 is a fragmentary sectional view taken along the line 24—24 in FIG. 23 of the right-hand unit in the mechanism for building in the bead rings of pneumatic tires and shows the arrangement of the stops.
Figure 3:
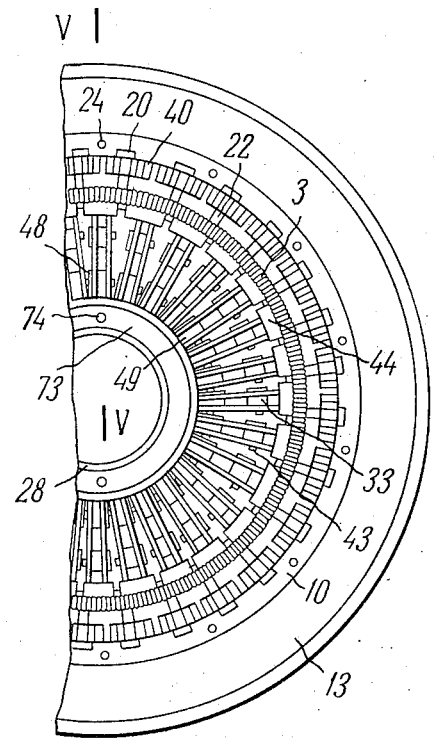
FIGURE 3 is an end view as viewed in the direction of arrow C in FIG. 2 of the righthand unit of the mechanism for building in the bead rings of pneumatic tires.
Figure 23:
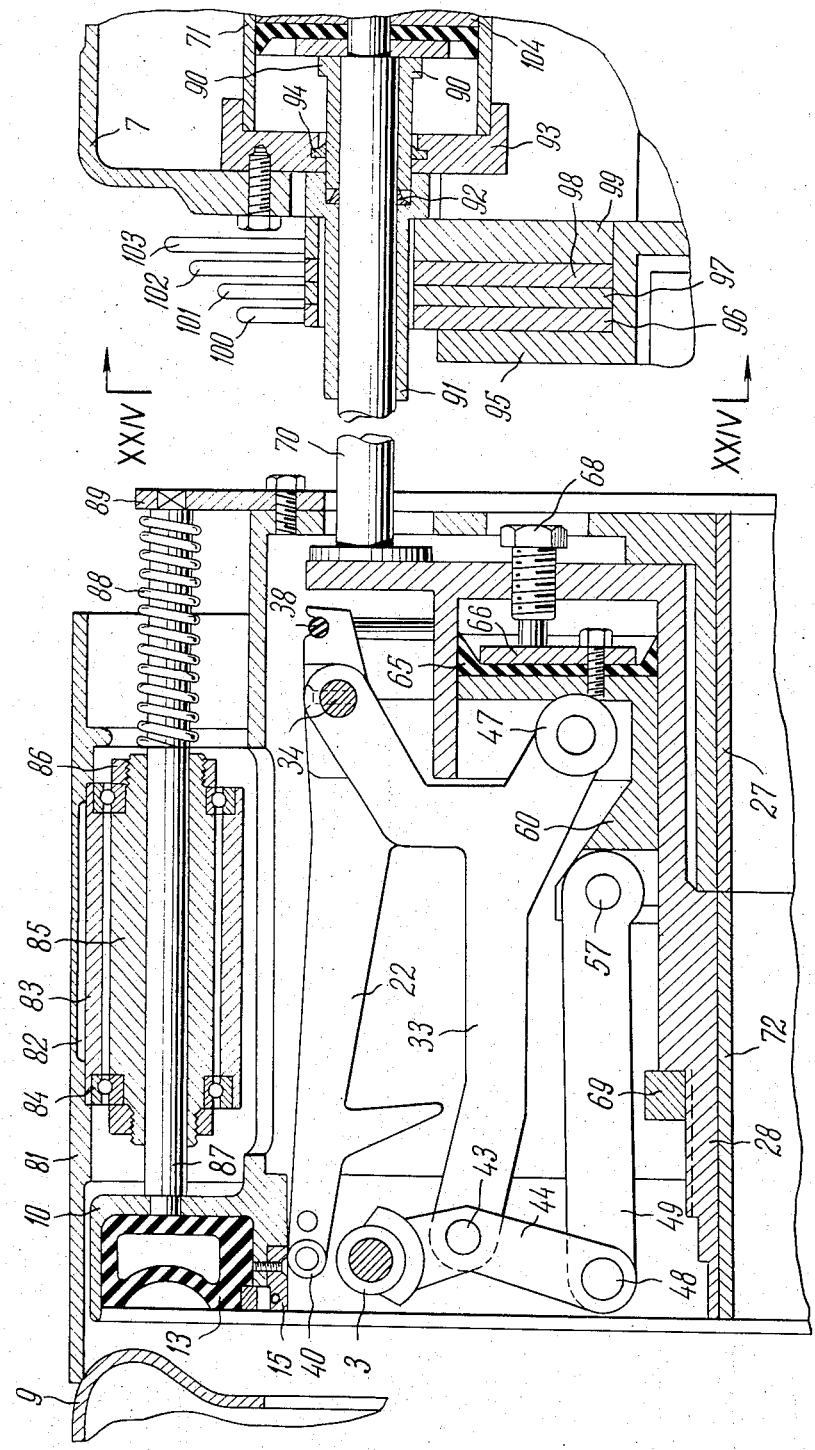
FIGURE 23 is a fragmentary longitudinal section exclusive of the machine shaft of the right-hand unit in the mechanism for building in bead rings of tires assembled by the layer method.

Instead of using thrust ring 75 and ring 73 with fingers 74 (FIG. 2) to limit the travel of annular pneumatic cylinder 28 and housing 10, use is made of guide bushings 90 and bushings 91, which are threadably connected and, which are mounted on and slide along rods 70 (FIGS. 23 and 24). Packing rings 92 are inserted between bushings 90 and 91. Packing rings 94 are provided in covers 93 of pneumatic cylinders 71.

Flange 95 is rigidly secured to machine housing 7. Annular stops 96, 97, 98 and 99 with handles 100, 101, 102 and 103 are freely mounted on flange 95. Stops 96, 97, 98 and 99, in the position shown in FIGS. 23 and 24, stop bushings 90 and 91 when the latter travel with pistons 104 in the direction toward drum 9.

This stops piston 104, rod 70 and annular pneumatic cylinder 28, to which they are linked, before the cylinder 28 reaches drum 9. Housing 10, in turn, runs up against annular pneumatic cylinder 28. The end of cylinder 81 runs up against drum 9, slightly compressing springs 88. In this position of left-hand unit A and right-hand unit B of the mechanism for building in the bead rings of tires, drum 9 can rotate together with cylinders 81 and the layers of cord are applied from the feeding drum.

The mechanism for building in the bead rings in tire assembly by the layer method operates in the following manner.

Since left-hand unit A and right-hand unit B of the mechanism for building in the bead rings of tires are substantially identical, only the operation of unit B is herein described.

Stops 96, 97, 98 and 99 are set to the position shown in FIGS. 23 and 24. Under the action of compressed air, pistons 104 with rods 70 advance housing 10 and annular pneumatic cylinder 28 toward drum 9 until they are halted by the stops.

At this point, cylinder 81 is held against drum 9, slightly compressing springs 88. A layer of cord is applied from the feeding drum onto drum 9 and cylinder 81 until a band of the required thickness is obtained. Then the band is processed by stitchers (not shown). Housing 10 and annular pneumatic cylinder 28 are then withdrawn from the drum, back to the initial position. Stop 96 remains in the position it has just occupied while stops 97, 98 and 99 are turned by handles 101, 102 and 103 through a certain angle to their off or idle position. Annular pneumatic cylinder 28 is advanced to drum 9 and it stops in a position corresponding to that shown in FIG. 15. From this position of the mechanism all operations for building in the bead rings are performed exactly in the same way as for the band method of tire assembly except that the travel of annular pneumatic cylinder 28 is limited by stops 96, 97, 98 and 99.

In conceiving the present invention, it is preferable to build in the bead drums of tires assembled by the band method on drums with nondetachable or integral shoulders.

The present invention has been applied, in particular, in the mechanisms for the building in of bead rings for tires of sizes 8.25–15, 11.00–20, 12.00–20 and 320–20.

Though the present invention is herein described with reference to the preferred method of its realization, it is to be understood that variations and modifications of the specific devices shown herein may be made without departing from the spirit and scope of the invention as is apparent to those skilled in the art.

Such variations and modifications are not considered to be outside of the essence and scope of the present invention as defined by accompanying claims.

We claim:

1. A mechanism adapted for use with a tire-building machine for forming beads containing bead rings for pneumatic tires, the machine having a pair of shafts, a drum on one of the shafts and two substantially identical units mounted on the shafts and located on either side of the drum for forming beads with bead rings inserted therein on pneumatic tires formed on the drum, each unit comprising: a helical garter spring encircling the associated shaft, actuation means axially movable on said shaft and supporting the garter spring for radial expansion and contraction between and expanded and a contracted position, turndown lever means operatively coupled with the actuation means and supported for pivotal movement for cooperating with the garter spring in the expanded position thereof to engage a tire band on the drum for the forming of said beads, housing means slidably supported on the shaft for movement towards and away from said drum, the housing means being adapted for supporting a bead ring and being operatively positioned with respect to the turndown lever means to contact the latter upon movement towards the drum and cause the turndown lever means to be pivotally moved towards the garter spring for cooperatively engaging the tire band together with the garter spring while depositing the bead ring on the thus engaged tire band, and bead forming means on said housing including an inflatable member which exerts pressure on the bead with the bead ring supported therein when the housing is adjacent the drum to thereby permanently form the bead with the bead ring supported therein.

2. A mechanism as claimed in claim 1 wherein said actuation means comprises a cylinder which is axially displaceable along the shaft, a piston supported in said cylinder for displacement therein in an axial direction and levers pivotally connected together as well as pivotally connected to the piston and the cylinder for undergoing pivotal displacement as the piston is displaced in the cylinder to expand and contract the helical garter spring.

3. A mechanism as claimed in claim 2 comprising means associated with said cylinder for displacing the same along said shaft between an inoperative retracted position, and an operative extended position adjacent the housing whereat the garter spring may be expanded to contact the tire band on the drum, and means associated with the cylinder for adjusting the operative position of the cylinder relative to the drum whereby the garter spring will assume different expanded positions to permit operation with different thicknesses of bands as well as a plurality of bands.

4. A mechanism as claimed in claim 3 wherein said means for adjusting the position of the cylinder relative to the drum comprises a pair of diametrically opposed pins secured to the cylinder and a turntable thrust disc on the drum having opposed pairs of surfaces of different height facing said pins for contacting the pins to adjust the location of the cylinder in the extended position thereof.

5. A mechanism as claimed in claim 3 wherein said means for adjusting the operative position of the cylinder comprises adjustable stop means operatively positioned with respect to the means for displacing the cylinder to limit the displacement of the cylinder.

6. A mechanism as claimed in claim 5 wherein said means for displacing the cylinder comprises a displaceable piston rod, and a bushing on said rod displaceable therewith, said adjustable stop means including a plurality of rotatable rings mounted around said piston rod for being selectively positioned in the path of the bushing to limit the stroke of the piston rod and thereby of the cylinder.

7. A mechanism as claimed in claim 1 comprising roller means on the housing for rollably contacting the turndown lever means.

8. A mechanism as claimed in claim 1 comprising rollers operatively positioned on the turndown lever means for contacting the tire band.

9. A mechanism as claimed in claim 2 comprising means adjustably connected to the cylinder to limit the displacement of the piston therein in both directions in adjustable manner.

10. A mechanism adapted for use with a tire-building machine for building in bead rings of pneumatic tires, the tire building machine having a shaft, the mechanism comprising two substantially identical units each of which is mounted on the shaft of the machine and each of which comprises a helical garter spring encircling the shaft, actuating drive means supporting the said helical garter spring and movably mounted on the shaft, said actuating drive means including an annular pneumatic cylinder, a piston within said cylinder and a system of levers that are hingeably connected together and are hingeably connected to the said annular pneumatic cylinder as well as to said piston for supporting the garter spring which is controlled thereby in accordance with the position of the piston within the cylinder and the position of the cylinder with respect to said shaft, turndown levers pivotally mounted on the annular pneumatic cylinder and including rollers at the ends thereof which contact the tire bead; and bead forming means including a rigid housing which is displaceably supported on said shaft for movement towards and away from the drum, said housing being operatively positioned with respect to the turndown levers to contact and pivotally move the same as the housing is moved towards the drum, said bead forming means further including inflatable pneumatic tube means adapted for compressing the beads formed by the turndown levers and the garter spring.

11. A mechanism as claimed in claim 10 comprising rigid fingers on the turndown levers adjacent the rollers at the end of the levers, said rollers and fingers extending along respective axes which are parallel to one another.

12. A mechanism as claimed in claim 11 wherein said cylinder is displaceable along said shaft, said mechanism further comprising adjsutable stops operatively associated with said cylinder for limiting the displacement of the cylinder in a direction towards the drum.

13. A mechanism as claimed in claim 12 wherein said piston is displaceable within the cylinder in opposite directions, said mechanism further comprising means adjustably supported in the cylinder for limiting the displacement of the piston within the cylinder in said opposite directions.

14. A mechanism as claimed in claim 13 comprising rollers on said housing for contacting the turndown levers as the housing is displaced relative to the shaft.

15. A mechanism adapted for use with a tire building machine for building in bead rings of pneumatic tires, the tire building machine having a shaft, the mechanism comprising two substantially identical units each of which is mounted on the shaft of the machine and each of which comprises a helical garter spring encircling the shaft and adapted for being radially expanded and contracted, actuating drive means supporting the said helical garter spring and movably mounted on the shaft, said actuating means including an annular pneumatic cylinder, a piston within the cylinder and a system of levers hingeably connected together and hingeably connected to said cylinder and piston for controlling expansion and contraction of the garter spring in accordance with the position of the piston within the cylinder as well as the position of the cylinder with respect to the shaft, adjustable stops mounted in the cylinder for limiting the displacement of the piston within the cylinder, means for displacing the cylinder comprising a rod and guide bushings on said rod, a plurality of flat stops rotatably supported at a fixed location in the path of the guide bushing, said flat stops being adjacent one another for selectively limiting displacement of said rod and thereby displacement of the cylinder, turndown levers pivotally mounted on the cylinder and including rollers at the ends thereof and rigidly secured fingers adjacent said rollers, said rollers and fingers extending along axes which are parallel to one another, bead forming means including a rigid housing which is displaceably supported on said shaft for movement towards and way from the drum, said housing being operatively positioned with respect to the turndown levers to contact and pivotally move the same as the housing is moved towards the drum, said bead forming means further including inflatable pneumatic tube means adapted for compressing the beads formed by the turndown levers and the garter spring, a cylinder encircling the housing for contacting the drum, rollers supporting the latter cylinder and spring means resiliently urging the latter cylinder against the drum.

16. A mechanism adapted for use with a tire building machine for forming beads containing bead rings on pneumatic tires, the machine having a pair of axially aligned shafts, a drum on one of the shafts and two substantially identical units mounted on respective shafts and located on either side of the drum for forming beads with bead rings inserted therein on pneumatic tires formed on the drum, each unit comprising: a helical garter spring encircling the associated shaft, a plurality of lever units supporting the garter spring, said lever units being angularly arranged around said shaft, a cylinder slidably mounted on said shaft, means for displacing said cylinder towards and away from said drum, means for limiting the displacement of the cylinder, a piston supported in said cylinder for axial displacement therein, means limiting the displacement of the piston in the cylinder, each lever unit including an orienting lever pivotally connected to the piston, a carrying lever having one end pivotally connected to the orienting lever and an opposite end supporting the garter spring, and an expanding lever having one end pivotally connected to the carrying lever and a pair of opposite remote ends, one of which is pivotally connected to the cylinder, the other being rollably supported on the cylinder, said piston being movable between extended and retracted positions in which the lever units are respectively displaced to raise and lower the garter spring which expands and contracts the same, a plurality of turndown levers angularly arranged around said shaft and pivotally connected to the cylinder and urged to a raised substantially radial position with respect to said shaft, a housing slidably mounted on said shaft for displacement towards and away from said drum along a path in which the housing contacts the turndown levers to cause the same to be depressed by being pivotally moved towards the lever units, roller means arranged around said housing for contacting the turndown levers, and rollers on the turndown levers adapted for cooperating with the helical garter spring to engage a tire band on the drum therebetween when the turndown levers have been pivotally moved by the housing and the garter spring has been expanded by the lever units.

17. A mechanism as claimed in claim 16 comprising an inflatable pneumatic tube supported on said housing facing said drum and operatively positioned with respect to said levers units and the turndown levers to compress a bead which is formed on the band by the turndown levers and the lever units.

18. A mechanism as claimed in claim 17 comprising a pair of diametrically opposed spring loaded retractable pins supported on the housing adjacent the pneumatic tube for supporting a bead ring which is to be inserted in the bead which is formed by the turndown levers and the garter spring on the lever units.

19. A mechanism as claimed in claim 16 wherein said turndown levers and the garter spring on the lever units define a circumferential gap therebetween when the turndown levers have been depressed by the housing and the garter spring has been expanded by the lever units, said tire band being adapted for extending through said gap, said means which limits the displacement of the piston in the cylinder including an adjustable stop which controls the maximum displacement of the piston towards the drum, said lever units in the latter position being raised to expand the garter spring, said gap being adjusted in correspondence with the adjustment of said stop.

20. A mechanism as claimed in claim 16 wherein said garter spring is raised to a position adjacent the drum whereat the garter spring is adapted for holding a formed bead against the drum, said means which limits the displacement of the housing including adjustable means for enabling adjustment of the position in which the housing is closest to the drum whereby beads of different thickness bands as well as multiple beads may be formed.

References Cited

UNITED STATES PATENTS

| | | | |
|---|---|---|---|
| 2,409,974 | 10/1946 | Breth et al. | 156—132 |
| 2,609,311 | 9/1952 | Engler | 156—132 |
| 3,178,327 | 4/1965 | Beckadolph et al. | |

FOREIGN PATENTS 882,327 11/1961 France.

EARL M. BERGERT, *Primary Examiner.*

C. B. COSBY, *Assistant Examiner.*